E. McALLISTER.
Improvement in Kneading Machines.
No. 122,184. Patented Dec. 26, 1871.
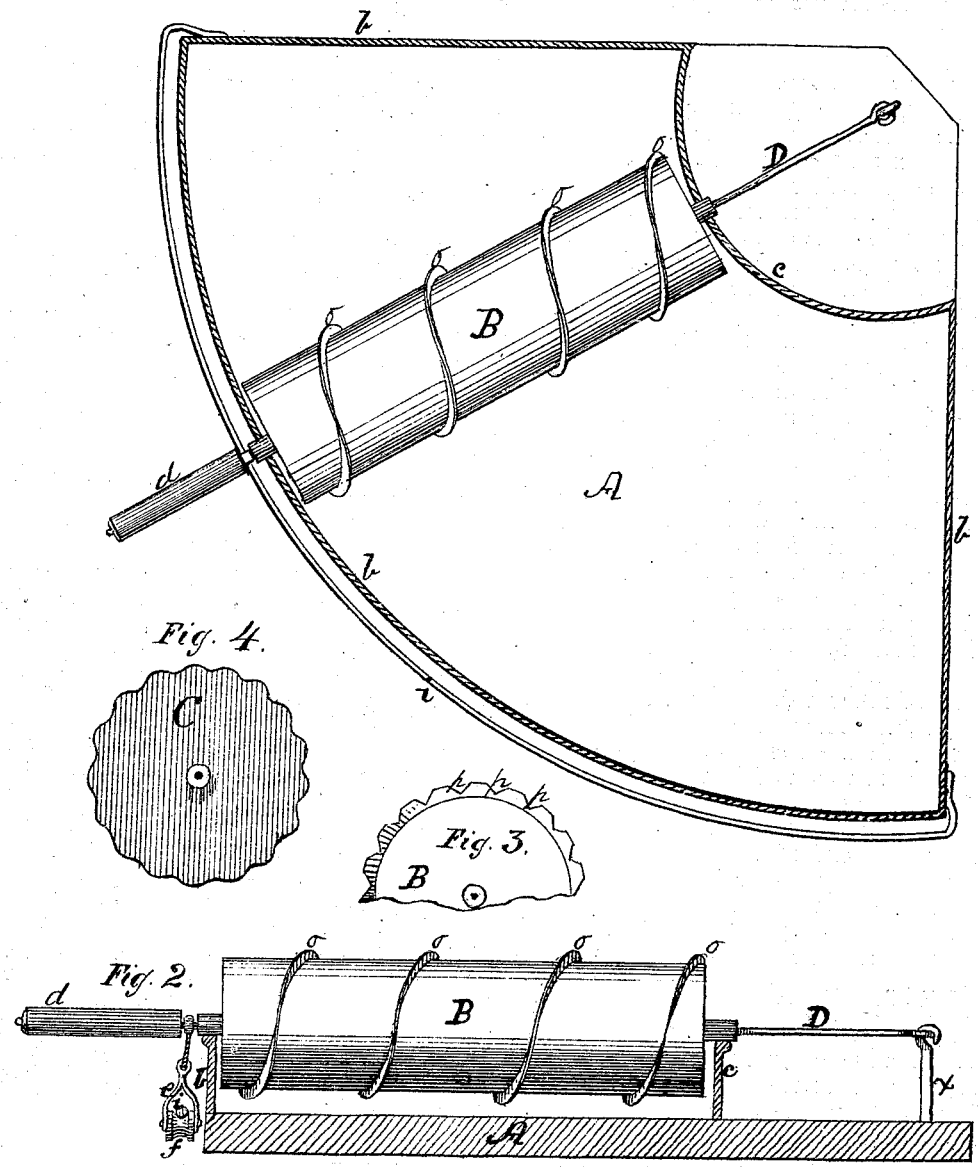

UNITED STATES PATENT OFFICE.

EDWARD McALLISTER, OF ROCHESTER, NEW YORK.

IMPROVEMENT IN KNEADING-MACHINES.

Specification forming part of Letters Patent No. 122,184, dated December 26, 1871.

*To all whom it may concern:*

Be it known that I, EDWARD McALLISTER, of the city of Rochester, in the county of Monroe and State of New York, have invented a new and useful Improvement in Convertible Kneading-Machines; and I do hereby declare that the following is a full, clear, and exact description thereof, reference being had to the accompanying drawing and to the letters of reference marked thereon.

Figure 1 represents a plan or top view of my improved kneading and meat-mangling machine with the meat-mangling roller in position for use. Fig. 2 represents a transverse section of the same. Fig. 3 represents a transverse section of a part of the same roller, and Fig. 4 represents a similar view of the dough-kneading roller.

My invention relates to the arrangement and combination of certain devices in convertible kneading and meat-mangling machines, by which such utensils are simplified and cheapened and made efficient by maintaining a constant yielding pressure upon the rollers through their traversing connection with the segmental trough in which they operate, as herein described.

The receptacle A is a shallow vessel, having a horizontal or flat bottom and vertical sides $b$ $c$ which retain the materials while being kneaded or mangled by the action of the rollers. The rollers B and C can revolve upon their axle-rods or shafts D, which, when used, are loosely hinged to the hook on the end of stud $x$. Between the handle $d$ and the journal-box at the end of the roller an elastic cord is placed, which connects the shaft $d$ with the frame $e$, which supports the sheave $f$. The rod $i$ is firmly fastened to the corners of the trough A, and passes through frame $e$, and serves as a railway, underneath which the sheave $f$ travels to hold down the roller to its work. The elastic cord will permit the roller to raise up in passing over uneven surfaces. Instead of the elastic cord a spiral spring inclosed in a tube with the sheave attached would serve the same purpose. The spiral flange $o$, which may be made with sharp serrated edges $p$, is to be used for preparing meat-steaks by rolling them with roller B. The action of these flanges will cut the fibers of the meat without pressing out its juices, as is the case when subjected to a pounding process. It is evident that the roller $c$ may be used not only for kneading dough but for pulverizing crackers, and for other analogous purposes. Several different rollers, of variously-formed irregular surfaces, may be employed, to be used, as occasion may require, for preparing different kinds of food. The elastic cord, which is detachable from the spindle D, (to admit a change of rollers,) holds or presses the roller down to its work as the operation of rolling is effected by the hand of the attendant, who clasps the handle $d$ and produces the reciprocating movement of the roller. As the inner end of the roller traverses only about one-third of the distance of the outer end, it is evident that the material will be subjected to a kneading process when roller C is used, and to the cutting process when roller B is employed.

I am aware that kneading-machines have been made convertible to be used for meat-mangling and other purposes; and I do not desire to broadly claim the feature of convertibility in such machines, but propose to restrict my claim to the arrangement and combination of the devices employed, and by which a yielding pressure is maintained during the operation of the rollers upon the segmental trough, as set forth.

Having fully described my invention, I claim herein and desire to secure by Letters Patent—

The trough A, in combination with the removable rollers B C, the elastic connection, and its traversing mechanism $i$ $e$ $f$, operating substantially as and for the purpose specified.

In witness hereof I have hereunto set my hand the 27th day of September, A. D. 1871.

EDWARD McALLISTER.

Witnesses:
H. P. K. PECK,
S. E. PECK.

(6)